3,340,219
LUBRICATED POLYACETAL COMPOSITIONS
AND PROCESS THEREFOR
Robert Max Stemmler, Westfield, N.J., assignor to
Celanese Corporation, a corporation of Delaware
No Drawing. Filed Oct. 22, 1964, Ser. No. 405,828
5 Claims. (Cl. 260—32.6)

This invention relates to novel polyoxymethylene compositions and processes for their production. More particularly, it relates to lubricated acetal copolymer compositions of improved homogeneity and physical, especially surface, characteristics.

Oxymethylene polymers, including copolymers and terpolymers having at least 60 percent recurring oxymethylene units, have been known for many years and are found generally disclosed in, e.g., Kern et al., Angewandte Chemie 73, pp. 176–186 (Mar. 21, 1961), and Sittig, M., Hydrocarbon Process and Petroleum Refiner 41, pp. 131–170 (1962).

For molding processes, especially those employing plunger type devices, such as certain injection molding devices, the use of an appropriate lubricant is often utilized to reduce friction losses and thereby increase production rate. In such systems, the lubricant is applied to the polymer in macro-particulate form (e.g., ⅛″ x ⅛″ pellets) as a surface layer. While such a process effects the desired improvement in production rate the physical characteristics of molded polyacetal articles in many instances are adversely affected, e.g., by blistering, molding discoloration, etc., which is believed to be due to the localized high concentraton of lubricant present at the pellet interfaces in the molded article, i.e., the surface layer of lubricant placed on the acetal polymer pellets is not uniformly distributed in the resulting molded article but remains as a semi-continuous layer at the particle interface, localized in occlusions or surface anomalies. Apparently, the presence of an excess over a critical concentration of lubricant effects a degradation of certain of the polyacetal physical characteristics apparent in, e.g., molding discoloration, blistering, etc.

Thus, is is an object of this invention to prepare homogeneous lubricated polyacetal compositions. It is a further object to provide molded polyacetal articles containing uniformly dispersed therein a lubricant, the molded article having excellent physical characteristics. An even further object is to provide lubricated polyacetal compositions moldable to articles having aesthetically pleasing surface characteristics. Another object is to provide a process for the preparation of such lubricated polyacetal compositions and molded articles.

It has now been found that polyacetals may successfully be molded to articles of excellent homogeneity and physical characteristics by incorporating the lubricant with particularly finely divided polyacetals prior to extrusion and pelletizing. In accordance with this invention, particulate form acetal polymer is dispersed with a suitable lubricant (as by dry blending), or is fed directly therewith to the hopper of a high shear apparatus, and preferably an extrusion device. The polymer-lubricant admixture is subjected to high shear mixing, and may thereafter be extruded through a suitable orifice, pelletized, and fed to a molding apparatus, such as an injection molding device. The sheared compositions (which may be in pellet form) and the molded articles prepared therefrom are homogeneous and exhibit excellent surface characteristics, e.g., high lubricity as indicated by spiral flow, no blistering as determined by visual, including water-immersion examination, low surface anomalies as indicated by measured surface smoothness, excellent adhesion to coatings as indicated by the application of an adhesive strip with or without prior cross-hatching with a pointed article, etc.

The successful dispersion or incorporation of the polymer lubricant permitting the production of molded articles having commercially acceptable physical characteristics has been found to be critically dependent upon the application of the lubricant to the polymer in particle form of less than about 20 mesh, preferably less than 30 mesh. Surprisingly, application of the lubricant to the surface of particulate pelletized polymer of even as little as 8–11 mesh results in inferior characteristics, e.g., surface blistering, upon molding.

In corporation of the lubricant in a high shear apparatus is preferred to insure optimum homogeneity, and most preferably a commercial extruder is employed. The use of a small screw type injection molding apparatus, for example, which imparts some shearing effect, is generally ineffective in providing the improved molded articles of this invention.

Apparently, both particle size of the polymer and shear, especially shear rate, are critical factors in effecting the production of the improved articles and compositions of this invention.

The polymers useful in accordance with this invention include the polyacetals set forth in the aforementioned Kern et al. and Sittig articles, and generally comprises at least 60 up to about 99.6 of recurring oxymethylene ($-CH_2O-$) units. The preferred polyacetals are the oxymethylene copolymers, containing a major proportion and preferably above about 60 wt. percent, of oxymethylene units and a minor proportion, most preferably no more than 15 wt. percent units containing $-C-C-$ bond or another structural unit less susceptible to thermal degradation than the aforesaid oxymethylene units. Suitable comonomers are found disclosed in the Kern et al. and Sittig et al. articles referred to hereinabove.

Most preferably the polyacetal is an oxymethylene copolymer having at least one chain containing at least 85 mol percent of recurring oxymethylene units interspersed with up to about 15 mol percent of $-OR-$ units, wherein R is a divalent radical containing at least two carbon atoms directly linked to each other and positioned in the chain between the two valences, with any substituent in the R radical being inert. Such copolymers are found disclosed, for example, in U.S. Patent No. 3,027,-352, of Walling et al., incorporated herein by reference.

Polyacetal terpolymers are also applicable in the practice of this invention and may suitably have at least one chain containing at least 85 mol percent of oxymethylene units interspersed with up to about 15 mol percent of $-OR-$ units, wherein R is a divalent radical containing at least two carbon atoms directly linked to each other and positioned in the chain between the two valences, with any substituent in the R radical being inert, at least 0.01 up to 7 mol percent of said $-OR-$ units having carbon atoms linked to other chains. Such copolymers may be found disclosed in commonly assigned U.S. patent application Ser. No. 229,715, of Heinz and McAndrew, filed Oct. 10, 1962, now abandoned, and incorporated herein by reference.

The polyacetals are provided in particularly finely divided form, e.g., in the range of 20 to 250 mesh, or lower. The particle form may be of any particular configuration including, for example, flake, spheroid, ovaloid, etc. However, the particle size employed in the incorporation process has been found to be a critical factor in effecting the improved results afforded by the practice of this invention. Generally, the particle size must be lower than about 30 mesh, e.g., 35–40 mesh, and most preferably a major proportion of the polymer charge falls in a range of 35–55 mesh. The polymer charge is generally substantially anhydrous but small amounts of moisture, such as may be adsorbed on the polymer surface, do not impair the operation of this invention.

Any suitable coloring agents, additives, or fillers, including glass, carbon black, titanium dioxide, finely divided copper, etc., may also be incorporated with the polymer.

Generally chemical stabilizers are simultaneously incorporated with the polymer lubricant, and may be selected from any of the well known class of polyacetal stabilizers as described in the Kern et al. or Sittig et al. references cited above. These stabilizers generally reduce the thermal degradation rate at 230° C. in a circulating air oven to below about 0.5, preferably below about 0.05 wt. percent per minute over a 45 minute test period. Suitable stabilizers include the combination of an antioxidant ingredient such as a phenolic antioxidant and most suitably a substituted bisphenol, and an ingredient to inhibit chain scission, generally a compound or a polymer containing trivalent nitrogent atoms. A suitable class of alkylene bisphenols includes compounds containing from one to four carbon atoms in the alkylene group, and having from zero to 2 alkyl substituents in each benzene ring, each alkyl substituent having from one to four carbon atoms. The preferred alkylene bisphenols are 2,2'-methylene bis(4 - methyl - 6 - tertiary butyl phenol) and 4,4'-butylidene bis(6-tertiary butyl-3-methyl phenol). Suitable phenolic stabilizers other than alkylene bisphenols include 2,6-ditertiary butyl-4-methyl phenol, octyl phenol and p-phenyl phenol. Suitable scission inhibitors for the preferred copolymers include carboxylic polyamides, polyurethanes, substituted polyacrylamides, polyvinyl pyrrolidone, hydrazides, compounds having 1 to 6 amide groups, proteins, compounds having tertiary amine and terminal amide groups, compounds having amidine groups, cycloaliphatic amine compounds and aliphatic acylureas. Suitable scission inhibitors as well as suitable antioxidants and proportions are disclosed in U.S. Patent 3,152,101, issued to Dolce on Oct. 6, 1964, U.S. Patent 3,144,431, issued to Dolce, Berardinelli and Hudgin on Aug. 11, 1964, application Ser. No. 258,126, now Patent No. 3,274,149, which is a continuation-in-part of application Ser. No. 838,427, filed by Berardinelli on Sept. 8, 1959, now abandoned, application Ser. No. 838,832, filed by Dolce and Hudgin on Sept. 9, 1959, now Patent No. 3,200,090, application Ser. No. 262,348, now Patent No. 3,219,727, which is a continuation-in-part of application Ser. No. 841,690, filed by Kray and Dolce on Sept. 23, 1959, now abandoned, application Ser. No. 256,146, now abandoned, which is a continuation-in-part of application Ser. No. 850,560, filed by Berardinelli, Kray and Dolce on Nov. 9, 1959, now Patent No. 3,084,839, U.S. Patent 3,133,896, of Dolce and Berardinelli, issued May 19, 1964, and application Ser. No. 4,881, filed by Kray and Dolce on Jan. 27, 1960, now Patent No. 3,156,669. The disclosures of the above-mentioned patents and commonly assigned applications are incorporated herein by reference.

The preferred stabilizer system comprises at least one amidine compound and an alkylene bisphenol. Most preferably, from about 0.02 to about 0.04 wt. percent of melamine, from about 0.08 to about 0.12 weight percent of cyanoguanidine, and from about 0.40 to about 0.65 wt. percent of 2,2'-methylene bis(6-t-butyl-4-methyl phenol) is employed.

Suitable lubricants are well known to the polyacetal art, and include the water-insoluble soaps of high melting point and preferably water insoluble metal salts of aliphatic carboxylic acids having at least twelve carbon atoms, and melting at a temperature in excess of 110° C.; long-chain aliphatic amides and especially the long chain (i.e., more than ten carbon atoms) derivatives; fatty acids; waxes; etc.; as, for example, zinc stearate, aluminum palmitate, magnesium stearate, lithium stearate, calcium stearate, stearic acid, ceresin, stearamide, oleamide, palmitamide, lauramide, ethylene bis-stearamide, oleamide, erucamide, linolamide, linoleamide, N-palmityl oleamide, N-stearyl oleamide, vinyl acetic acid amide; etc.; including mixtures in all proportions of any of the foregoing.

The preferred lubricants as a class are the amide waxes, and most preferably aliphatic amides, especially the long chain derivatives, wherein the aliphatic moiety is derived from saturated and unsaturated (non-benzenoid) hydrocarbons and their substituted derivatives (wherein the substituents are inert) having an open chain or cyclic structure which may include a minor proportion of heteratoms selected from the group consisting of oxygen, sulfur and nitrogen in the skeletal structure. The preferred aliphatic moieties have an open chain (linear or branched) carbon skeleton of at least one up to about 33 carbon atoms.

Exemplary such amide lubricants include, in addition to those set forth above, propionamide, butyramide, valeramide, capramide, margaramide, carnaubamide, cerotamide, melissamide, linolinamide, sorbamide, methylacrylamide, cyclohexanoamide, N-bromo stearamide, N-methyl lauramide, N-ethoxyoleamide, N-phenyl palmitamide, N-propionamidostearamide, N-butyramidolauramide, N-stearamidopalmitamide, etc.

Additional such lubricants, e.g., the amide waxes, may be found exemplified in the industrial literature, as e.g., the Handbook of Chemistry and Physics (Chem. Rubber Pub. Co., Cleveland, 1956-57), in the table at pages 1404–1407, incorporated herein by reference.

Preferably, the lubricants are dicarboxylic acid amides of aliphatic diamines, having the structure

wherein $R_y$ is an aliphatic moiety as defined hereinabove and most preferably is derived from a higher fatty carboxylic acid having at least 10 carbon atoms up to about 33 carbon atoms, $R_x$ is an aliphatic moiety as defined hereinabove, and $n$ is an integer from 1 to 2. It is to be understood that the carboxylic acid moieties may be the same or different in the bis-aliphatic amides, and that the aliphatic moiety may contain additional amide groups of the structure

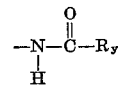

Suitable such di-fatty acid amides of aliphatic diamines include, for example, ethylene distearamide, propylene distearamide, butylene distearamide, propylidene dioleamide, N-(ethylideneoleamide) stearamide, methylene-bis-lauramide, N-(ethylenestearamide) lauramide, N-(methylene palmitamide) capramide, etc.

The lubricants may be provided in any particle form configuration as, e.g., beads, powdered, atomized, etc. ranging from about 50 mesh to about 100 mesh down to as little as 5 microns. While the lubricant may be supplied as a dispersion in a suitable vehicle such as water, the charge is preferably dry powder in the range of small particle diameters.

Amounts of from about 0.001 up to less than 0.25 wt. percent of lubricant, preferably from about 0.03 to about 0.23 wt. percent, based on the polymer, are employed as the basic charge, which may be added to the polymer in one or more portions within the ranges set forth. Incorporation is substantially complete. The amount of lubricant incorporated, especially where the water-insoluble metal salts of aliphatic carboxylic acids and the preferred amide waxes are employed, has been found to be a critical factor in securing the desired physical characteristics. Thus, both the total amount of lubricant and the localized concentration must be carefully controlled within the limits set forth. From about 0.15 up to less than about 0.23 wt. percent is commonly employed with the preferred amide waxes, while amounts of from about 0.05 up to less than about 0.12 is generally utilized with the water-insoluble metal salts of carboxylic acids.

The initial polymer-lubricant admixture may be prepared in any conventional fashion, as, for example, by dry blending, coprecipitation, roll milling, or drum tumbling, or even by feeding directly to the high shear mixing apparatus.

Such apparatus is preferably a commercial extruder, but may also be a Banbury mixer having oppositely rotating blades or any other high shear mixing device wherein the polymer is maintained in melt state.

Any commercial extrusion device, ranging from, e.g., ½" to a 10" size may be satisfactorily employed in the practice of this invention. Single or multiple screw devices may be used, having various feed throats, e.g., vertical, slope (such as 45°), or undercut, and any screw construction of full-flighted or torpedo type, e.g., constant pitch, varying channel depth; metering with rapid transition; varying pitch with constant channel depth; constant pitch smooth torpedo; varying pitch full-flighted torpedo; etc. Length to diameter ratios may range from 10:1 to about 24:1, although the range of 13:1 to about 20:1 is generally employed. The screw clearance may range from about 1 mil to about 25 mils, preferably from about 5 to about 10 mils. The screw may be driven at rates between about 1 and 150 r.p.m. generally in the range of 10 to 100 r.p.m. and most preferably between about 20 to 75 r.p.m. Melt and die temperatures are between about 330° and 550° F. Any suitable orifice, generally having a cross-sectional area of about 2% that of the barrel, may be employed in pelletizing. Suitable such extruders are found disclosed in commonly assigned U.S. Patent applications Ser. Nos. 230,645, of Fisher et al., filed Apr. 5, 1961, and 288,240, of Seddon et al., filed June 17, 1963, and incorporated herein by reference.

A typical extrusion operation employs a 2½" extruder with a compression ratio of 3.5/1, four metering flights, a die temperature of 365° F., a stock temperature of 380° F., a barrel temperature of 350° F.-rear, 365° F.-middle, and 360° F.-rear, and a screw r.p.m. of 30. Residence times may be between about 0.5 and 10 minutes, preferably between about 2 and 5 minutes.

The extruded and, if desired, pelletized lubricated polyacetal may be molded as, for example, by heating the polymer to a substantially plastic state and advancing the thus formed at least semi-molten mass of polymer into contact with a shaping surface, to articles of excellent surface characteristics and homogeneity, e.g., bearings, wheels, gears, cams, piping, pumps, valves, etc. The lubricated compositions are particularly useful in injection molding.

Generally, any commercial injection molding device may be employed, ranging in capacity from ½ oz. to 200 oz., and of a variety of constructions. Pressures may be between about 5,000 and 30,000 p.s.i., preferably between about 15,000 and 20,000 p.s.i. Mold temperatures are commonly in the range of 150° F. to about 260° F., preferably between about 180° F. and 220° F. Material temperatures may be between about 370° F. and about 480° F. for the preferred lubricated compositions, but generally lower temperatures are avoided to prevent surface blistering. For example, melt temperatures of between about 370° F. and 420° F. are successfully employed with amounts of ethylene distearamide of between about 0.16 and 0.18 wt. percent, whereas melt temperatures are generally held above about 400° F. for higher concentrations. Total cycle times of 30 to 75 seconds may be employed, which will vary with the size of the molded part, e.g., thickness. A typical cycle calls for 25 seconds injection, 15 seconds die close, and a 5 second delay, with optionally a 10 second booster.

A typical injection molding operation for, e.g., a sprayer gun body, employs a 12 to 16 oz. device with a 2 cavity mold; a shot weight of 110 grams; injection cylinder temperatures of 400° F.-rear, 350° F-center, and 350° F-front; a plunger temperature of 380° F., a mold temperature of 150° F.; a clamp pressure of 150 tons; an injection pressure of 20,000 p.s.i.; and a cycle time of 15 seconds-plunger, 25 seconds-clamp, and 10 seconds-booster for a total of 72 seconds.

The compositions and molded articles of this invention comprises an acetal polymer containing uniformly dispersed therein less than 0.25 weight percent of a lubricant therefor. The products are of excellent homogeneity and surface appearance and exhibit enhanced lubricity (as measured by the spiral flow test described herein below) without degradation of other desirable physical properties. The surface exhibits a smoothness of, e.g., less than 25 microns average height, high gloss, no surface anomalies such as blisters (as indicated by the blistering test described herein below) is free of exudation, and of excellent color (measured by test values, described herein below). The desirable physical characteristics of the polyacetals such as thermal stability, moldability, resistance to chemical degradation, etc., are retained without limitation of end use.

The lubricity of the polymer composition is measured by feeding pelletized lubricated polymer to a 3 oz. Fellows injection molding machine, and providing a ½" cushion by using a constant weight on the cylinder, and molding at a pressure of 20,000 p.s.i. and a mold temperature of about 200° F. with a cycle time of 45 seconds (25 seconds-injection; 15 seconds-die close; 5 seconds-delay) into a center gated spiral mold having a 3 inch radius from the vortex, a semi-circular configuration of ¼" width and ¼" radius, and a total length of 35 inches. Constant volume of polymer is maintained by feeding pellets for each succeeding cycle equal to the weight of the preceding molded spiral. Values are taken at three different melt temperatures, e.g., 360, 390, and 430° F., and measured in inches of polymer flow in the spiral mold.

The molded spiral may be directly measured for length, or the spiral mold may be engraved with length measurements which are molded into the spiral. Values taken on the two molds will not be directly comparable due to the increased resistance to flow provided in the engraved mold by the raised legends.

The preferred acetal copolymers generally exhibit a spiral flow at 360° F. of between about 11 and 26 inches, and at 430° F. of between about 16 and about 38 inches, whereas the preferred acetal terpolymers exhibit spiral flows of about 3–4 at 360° F. and about 6–7 at 430° F. Generally, the lubricated compositions exhibit an increased spiral flow of at least 0.5 inch, preferably at least 1 inch, at the test temperatures employed. The preferred composition may exhibit an increased spiral flow of up to 2 inches. As used in the specification and claims, the term "spiral flow" is defined in terms of the foregoing test over a range of melt temperatures between about 350° F. and about 450° F.

A measure of blistering is obtained by directly examining a sample of molded polymer, e.g., a tensile bar, or immersing the sample in water at room temperature, and observing altered light refraction caused by surface blisters. The lubricated compositions are measured for color properties in an M$x$ molding discoloration test.

13 grams of the pelletized, stabilized copolymer was charged to the bore of an Extrusion Plastometer (described in ASTM D–1238–57T) confined in the barrel for 30 minutes at 230° C., discharged, and compression molded (at 190° C. for 1 minute without application of pressure, and 4 minutes at 6500 p.s.i.g.), into an 11 grams disc having a 2½" diameter. These compression molded discs are color measured with the Hunterlab D–25 Color Meter.

The Hunterlab Color Meter test yields a read-out on three scales, L, $a$ and $b$. The L scale is a measure of lightness and varies from 100 for perfect white to zero for black. *a* measures redness when plus, gray when zero, greenness when minus, and *b* measures yellowness when plus, gray when zero, blueness when minus. Thus, visually tan to brown discoloration observed after the foregoing test is characterized by increased positive *a* values, increased high positive *b* values, and decreased L values.

The polymers were stabilized with 0.40–0.65 wt. percent of 2,2′-bis(4-methyl-6-t-butyl phenol) and 0.08–0.14 wt. percent of cyanoguanidine, except as otherwise indicated.

The following examples supplement without limitation the description set forth hereinabove.

EXAMPLE I (A) Internally lubricated compositions of a trioxane-2 wt. percent ethylene oxide copolymer (in flake form with 70% in the range of 40–50 mesh, and having a melt index of 9.0 dg./min.) with 0.18 and 0.25 wt. percent of powdered ethylene disteramide, respectively, were prepared by tumbling the constituents in a drum for 30 minutes at 9 r.p.m., and extruding the dry dispersed mixture in a 2″ extruder, operated with a screw speed of 90 r.p.m., power of 190 watts, 2700 lbs. pressure, a die temperature of 380° F., barrel temperatures of 358–390, 400, 390, and 380 in rear to forward zones, and a production rate of 40 lbs./hr. Samples of each composition were fed to a 3 oz. Fellows injection molding machine, and molded at a pressure of 20,000 p.s.i. (½″ cushion with cylinder), a mold temperature of about 200° F., and a cycle time of 45 seconds (25 seconds-injection, 15 seconds-die close, 5 seconds-delay) into a center gated spiral mold having a 3 inch radius from the gate, a semi-circular configuration of ¼″ width and ¼″ radius, and a total length of 35 inches, with the following results:

*Spiral flow test*

| Lubricant, wt. percent | Melt Temperature | | |
|---|---|---|---|
| | 400° F. | 430° F. | 460° F. |
| 0.18 | 22.7 | 28.1 | 34.1 |
| 0.25 | 23.7 | 29.7 | 34.6 |

Samples molded at melt temperatures of 415° F., 440° F., and 460° F. were visually examined for blistering by immersion in water at room temperature, and observing altered light refraction caused by surface blisters. The only samples exhibiting surface blisters were those obtained at a 0.25% ethylene disteramide concentration and a melt temperature upon molding of 415° F. Samples containing a lower concentration of lubricant or obtained with higher melt temperatures exhibited no blisters. All other surface conditions, gloss and color were comparable for the lubricated compositions.

(B) Identical results were obtained with levels of ethylene disteramide of 0.16 and 0.20 wt. percent. M*x* color values taken (as described hereinabove) on samples of the lubricated compositions compared as follows:

| Lubricant, wt. percent | Color Values | | |
|---|---|---|---|
| | L | a | b |
| 0.16 | 81.6 | −1.3 | 19.8 |
| 0.18 | 81.0 | −1.1 | 20.9 |
| 0.20 | 82.2 | −1.7 | 20.7 |
| 0.25* | 85.2 | −2.4 | 13.9 |

*Sample of Example II(A).

EXAMPLE II 0.04 wt. percent of powdered ethylene disteramide (powdered "Acrawax C" sold by Glyco Chem. Co., 95% passing through a 100 mesh screen) was tumbled with trioxane-2.0 wt. percent ethylene oxide copolymer flake (70% passing through 40–50 mesh screens) in a drum rotating at 20 r.p.m. for 30 minutes. The resulting dry, dispersed composition was fed to a 2½″ "Prodex" extruder (L/D ratio of 24:1, a die temperature of 370° F., barrel temperatures of 350, 370, 370 and 370 from rear to forward zones, a compression ratio of 2/1, a screw speed of 30 r.p.m., and a production rate of about 90 lbs./hour), extruded and pelletized. Molded articles were of excellent surface appearance and exhibited no blisters. Identical results were obtained when a lubricant level of 0.10 wt. percent was employed.

Lubricated compositions prepared by dispersing a lubricant at the same concentration level with macro-particulate polyacetal copolymer pellets (nominally ⅛″ x ⅛″ cylinders) and without extrusion treatment yielded molded articles exhibiting surface blisters with ethylene distearamide and discoloration with zinc stearate. No exudation, measured by wiping the surface of 1″ x 3″ injection molded bars (at 420–430° F., a pressure of 25,000 pounds, a dye temperature of 120° C., and a 60 second cycle) suspended in air and maintained at temperatures of 80° C. and 100° C. with a dark cloth, was exhibited for periods of at least two weeks.

EXAMPLE III

A series of compositions of a trioxane-2.0 wt. percent ethylene oxide copolymer of melt index 2.5 dg./min. in flake form (40–50 mesh) and powdered ethylene disteramide were prepared in accordance with the process described in Example I, at levels of 0.14, 0.16, 0.18 and 0.20 wt. percent based on the polymer. No blisters or exudation, and excellent surface characteristics were exhibited by molded articles in each instance.

Spiral flow measurements, taken as described in Example I, were as follows:

| Lubricant, wt. percent | Melt Temperature, ° F. | Spiral Flow, inches |
|---|---|---|
| 0.16 | 370 | 13.6 |
| | 400 | 16.0 |
| 0.18 | 370 | 14.1 |
| | 400 | 16.5 |
| 0.20 | 370 | *13.7 |
| | 400 | *16.9 |

*Low value attributed to exposure of molding machine to air drafts.

The sample containing 0.14 wt. percent of ethylene distearamide exhibited the following representative physical properties:

Melt index, dg./min. -------------------- 2.3
10 x/x ratio ---------------------------- 18.3
$K_D$ 230° C. (wt. percent/min.) --------- 0.023
Cyanoguanidine (wt. percent) ------------ 0.10
2,2′-methylene bis (4-methyl-6-t-butyl phenol)
 (wt. percent) ------------------------- 0.47
Vicat softening point (° C.) ------------ 161.4
Notched Izod impact strength (ft. lbs./in.)
 of notch ------------------------------ 1.0
Rockwell hardness (M) ------------------- 76.0
5½ hour wgt. loss (percent) ------------- 13.65
Tensil impact strength (ft. lbs./sq. in.) -------- 88
Unnotched Izod (ft. lbs./in.) ----------- 25.66

The compositions exhibited M*x* discoloration values, taken as described hereinabove as follows:

| Lubricant, wt. percent | Color Values | | |
|---|---|---|---|
| | L | a | b |
| 0.14 | 83.9 | −1.8 | 17.9 |
| 0.16 | 81.4 | −0.9 | 19.8 |
| 0.18 | 79.8 | −0.1 | 21.3 |
| 0.20 | 79.1 | −0.3 | 22.1 |

Nominal color values for an unlubricated sample of the copolymer described above are L=78.0 min., a=0.0 max. and b=24.0 max.

Molded articles prepared by dispersing a lubricant on the surface of macro-particulate copolymer pellets (8–11 mesh) and without extrusion treatment, at concentration levels comparable in lubricity to that secured with the internally lubricated compositions set forth above, resulted in inferior color values or surface blistering.

For example, a variety of samples externally lubricated with zinc stearate at comparable levels to the 0.16–0.20 ethylene distearamide internally lubricated compositions described above (0.03–0.05 wt. percent of zinc stearate) exhibited inferior color values with the identical copolymer, as follows:

| Wt. percent Zinc Stearate (surface application) | Color Values | | | Melt Temperature, °F. | Spiral Flow, inches |
|---|---|---|---|---|---|
| | L | a | b | | |
| 0.038 | 77.7 | +0.2 | 21.4 | 370 | 13.7 |
| | | | | 400 | 14.3 |
| 0.046 | 70.5 | +4.0 | 23.8 | 370 | 16.4 |
| | | | | 400 | 16.8 |

EXAMPLE IV

⅛" x ⅛" pellets of a trioxane-2.0 wt. percent ethylene oxide copolymer, having a surface layer of ethylene distearamide (0.10 wt. percent) was fed to a 1" screw extrusion device and extruded (L/D of 14:1, a die temperature of 360° F., a stock temperature of 375° F., barrel temperatures of 350° F., and a screw speed of 23 r.p.m.). All samples exhibited surface blisters.

It is to be understood that the foregoing detailed description is given merely by way of illustration and that many variations may be made therein without departing from the spirit of my invention.

The embodiments of the invention in which an exclusive property or privilege is claimed are defined as follows:

1. A process for the production of lubricated polyacetal molding compositions comprising high shear mixing
    (a) an oxymethylene polymer having at least 60 mol percent oxymethylene (—CH$_2$O—) units, said polymer consisting of particles having a particle size of less than about 20 mesh,
    (b) with from about 0.001 up to less than about 0.25 weight percent, based on said polymer, of an oxymethylene polymer lubricant, and
    (c) thereafter recovering the lubricated molding composition of said polymer containing uniformly dispersed therein less than about 0.25 weight percent of said lubricant, said composition exhibiting a greater spiral flow than an otherwise identical composition absent said lubricant.
2. The process of claim 1 wherein
    (a) the oxymethylene polymer is an oxymethylene copolymer having at least one chain containing at least 85 mol percent of recurring oxymethylene (—CH$_2$O—)

units interspersed with up to about 15 mol percent of (—O—R—) units, wherein R is a divalent radical containing at least two carbon atoms directly linked to each other and positioned in the chain between the two valences, with any substituent in the R radical being inert,
    (b) the high shear mixing is conducted at a melt temperature between about 330 and 550° F. and at a screw speed of about 1 to 150 r.p.m., and
    (c) the oxymethylene polymer lubricant is an amide wax.
3. The process of claim 2, wherein said amide wax is a dicarboxylic acid amide of an aliphatic diamine, wherein the carboxylic acid moiety has between about 10 and about 33 carbon atoms.
4. A process for the production of lubricated polyacetal molding compositions comprising high shear mixing
    (a) an oxymethylene polymer having at least 60 mol percent recurring oxymethylene (—CH$_2$O—) units, said polymer consisting of particles having a particle size in the range of 20 to 250 mesh,
    (b) with from about 0.03 to about 0.23 weight percent, based on the polymer, of an oxymethylene polymer lubricant selected from the class consisting of
        (i) water-insoluble soaps melting at a temperature of at least 110° C.,
        (ii) long-chain aliphatic amides,
        (iii) derivatives of long-chain aliphatic amides containing more than ten carbon atoms per chain,
        (iv) fatty acids, and
        (v) waxes,
    (c) said high shear mixing being conducted at a melt temperature between about 330 and 550° F. and at a screw speed of between about 10 and 100 r.p.m., and
    (d) thereafter recovering the lubricated molding composition of said polymer containing uniformly dispersed therein less than about 0.23 weight percent of said lubricant.
5. The process of claim 4, wherein the lubricant is ethylene distearamide.

References Cited
UNITED STATES PATENTS
| | | | |
|---|---|---|---|
| 2,770,609 | 11/1956 | Symonds | 260—32.6 |
| 3,164,563 | 1/1965 | Maxwell | 260—67 |
| 3,183,212 | 5/1965 | Hopff et al. | 260—67 |
| 3,219,630 | 11/1965 | Sidi | 260—67 |
| 3,236,929 | 1/1966 | Jupa et al. | 260—32.6 |

FOREIGN PATENTS
697,096  11/1964  Canada.

MORRIS LIEBMAN, *Primary Examiner.*

L. T. JACOBS, *Assistant Examiner.*